June 4, 1968 — E. KRZYSZCZUK — 3,386,702
AIR DRIVEN VARIABLE SPEED TURBINE FOR ANGULAR AND STRAIGHT HANDPIECES
Filed July 25, 1966 — 2 Sheets-Sheet 1

INVENTOR:
EDWARD KRZYSZCZUK
BY Dawson, Tilton, Fallon, Lungmus & Alexander
ATT'YS June 4, 1968

E. KRZYSZCZUK 3,386,702

AIR DRIVEN VARIABLE SPEED TURBINE FOR ANGULAR
AND STRAIGHT HANDPIECES

Filed July 25, 1966

INVENTORS:
EDWARD KRZYSZCZUK

BY Dawson, Tilton, Falloy, Lungmus, Alexander

ATT'YS

United States Patent Office 3,386,702
Patented June 4, 1968

3,386,702
AIR DRIVEN VARIABLE SPEED TURBINE FOR ANGULAR AND STRAIGHT HANDPIECES
Edward Krzyszczuk, Chicago, Ill., assignor to American Hospital Supply Corporation, Evanston, Ill., a corporation of Illinois
Filed July 25, 1966, Ser. No. 567,759
10 Claims. (Cl. 253—3)

This invention relates to a dental handpiece, and, more particularly, to a dental handpiece driven by compressed air or other fluid.

A principal object of this invention is to provide a compact turbine handpiece whose rotational speed can be accurately adjusted between a wide range of speeds.

A further object of this invention is to provide a turbine-driven dental handpiece whose speed can be maintained accurately at a relatively low rate of rotation. Convention air-driven handpieces commonly operate at rotational speeds in excess of 200,000 revolutions per minute (r.p.m.)—speeds too high for certain dental operations such as prophylaxis and amalgam condensing. Since such conventional units cannot be operated at substantially lower speeds and still deliver adequate torque, dentists normally rely on belt or gear-driven equipment for such lower speed operations. It is therefore an important object of the present invention to provide a direct-driven air turbine handpiece which, unlike prior units, is capable of operating at selected speeds within the range of 1,000 to 100,000 r.p.m. and still, at the same time, provide ample torque.

Still another object of this invention is to provide a dental handpiece which will develop high torque and which will automatically compensate for changes in load conditions, thereby accurately and automatically maintaining a preselected rate of rotation, even at relatively low speeds.

Further objects and advantages of this invention will be indicated as the specification proceeds.

The invention is explained in conjunction with the accompanying drawing, in which—

Figure 1:
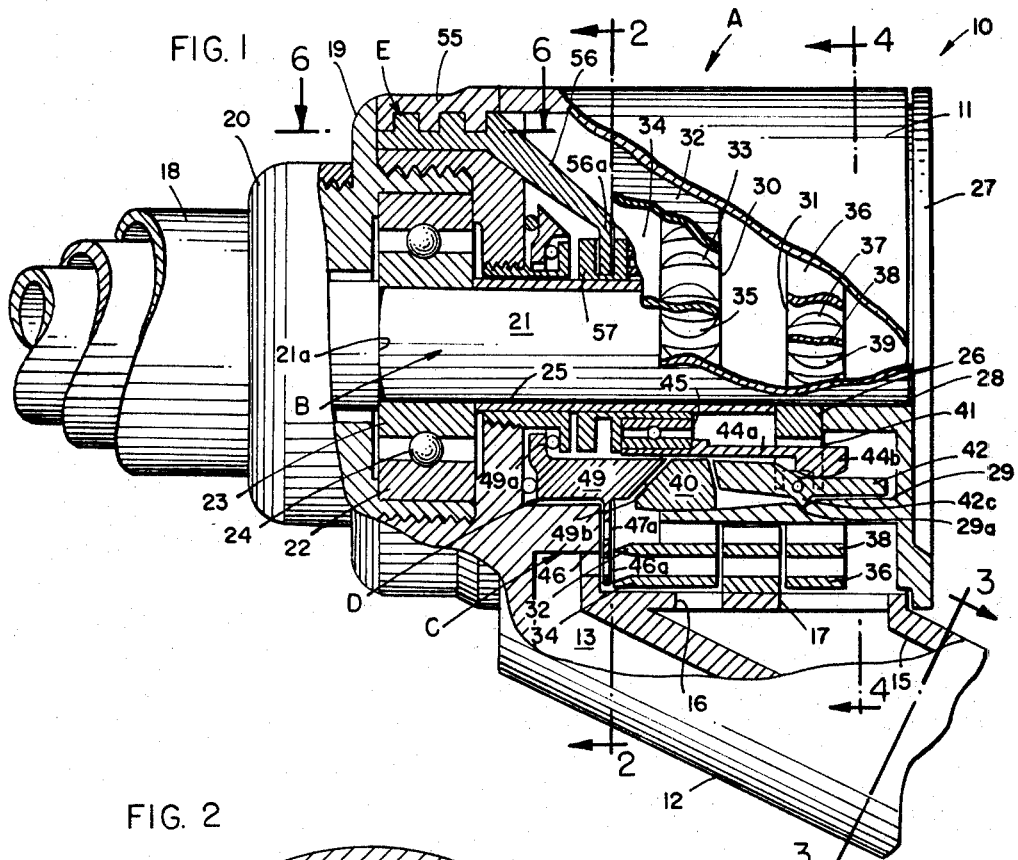
FIG. 1 is an elevational view, partly in section, of a dental handpiece constructed in accordance with the present invention.

Referring now to the drawings, and in particular to FIG. 1, the numeral 10 generally designates a dental handpiece which embodies the present invention and which essentially comprises a housing assembly A, a rotor assembly B, a stator assembly C, a fluid flow restricter assembly D, and an adjusting assembly E. The housing assembly A provides the casing in or on which the other assemblies are mounted. Air under pressure is delivered to the casing from a suitable source, passes through the stator assembly C, and is then directed through the fluid flow restricter assembly D to the rotor assembly B in such a manner that the rotor assembly B is caused to rotate. The adjusting assembly E controls the fluid flow restricter assembly D, thereby controlling the speed of the rotor assembly B.

Figure 3:
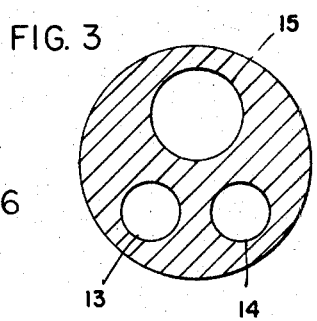
FIG. 3 is a sectional view taken along the line 3—3 of FIG. 1.

Turning now to a more detailed description of the invention, the housing assembly A includes a generally cylindrical housing or casing 11 which has a laterally and rearwardly inclined conduit portion 12 formed integrally therewith. The conduit portion defines first and second fluid inlet passages 13 and 14 which communicate with a source of air under pressure (not shown) and which convey the air to stator assembly C within the chamber of the handpiece housing. Suitable valve means (not shown) may be provided in the conduit portion, or at the air pressure source, to direct air into either of the parallel inlet passages 13 and 14 depending on the desired direction of rotation of the rotor. As shown most clearly in FIGS. 1, 3 and 4, an enlarged exhaust passage 15 also extends through conduit portion 12. The exhaust passage communicates with the rotor chamber of housing 11 through a pair of axially-spaced exhaust ports 16 and 17 and conveys air back to the pressure source where it is again compressed, filtered, injected with a lubricant mist and recirculated through the system, all as is well known in the art.

Housing 11 comprises the rear portion of the full housing assembly A, the front portion being of conventional construction and therefore being only partially illustrated in the drawings. The front portion of the assembly includes an elongated sleeve extention 18 which serves as the handle for the handpiece and which is detachably connected at its rear end to the front end of housing 11 by means of a threaded coupler 19 and an internally threaded mounting ring 20. It should be noted that while the housing assembly A defines what is commonly known as a "straight" handpiece, the operating mechanism to be described hereinafter may also be used in handpieces of the "contra-angle" type.

The rotor assembly B includes a rotor shaft 21 which is rotatably supported within housing 11 by a ball bearing assembly comprising an outer race 22 which is snugly received and firmly supported by the coupler 19, and inner race 23 which is press-fitted upon an intermediate portion of shaft 21 against the shoulder enlargement 21a, and a series of ball bearings 24. It is to be understood that the forward end of the rotor shaft 21 may also be supported by a second ball bearing assembly (not shown) at the front end of the handpiece.

Figure 4:
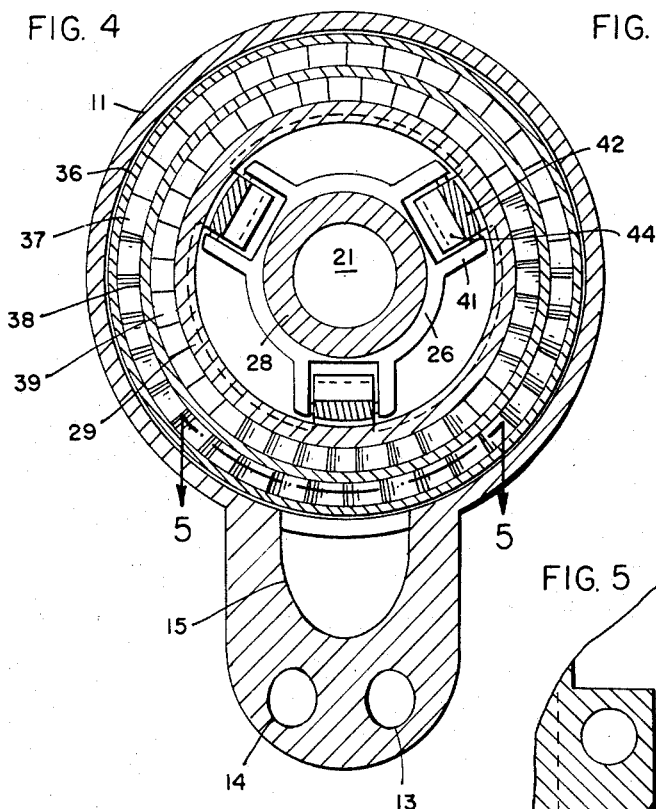
FIG. 4 is a sectional view taken along the line 4—4 of FIG. 1.
Figure 6:
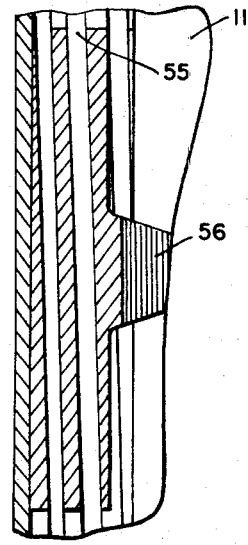
FIG. 6 is a fragmentary sectional view taken along the line 6—6 of FIG. 2.
Figure 5:
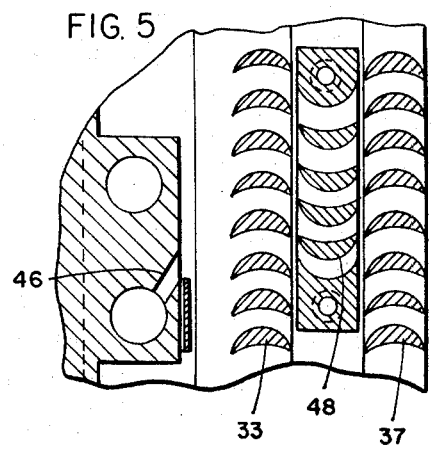
FIG. 5 is a fragmentary sectional view taken along the line 5—5 of FIG. 4.

Referring to FIGS. 1 and 4, the rear portion of the rotor shaft behind the bearing assembly carries a spacer sleeve 25 and a mounting ring 26, both of which are tightly fitted or otherwise firmly secured to the shaft. The spacer sleeve is interposed between and engages both the inner race 23 of the bearing assembly and the mounting ring 26. Behind the mounting ring, and tightly affixed to the rear end of the shaft 21, is an end cap 27. As shown in FIG. 1, the end cap is of substantial size, being of approximately the same diameter as cylindrical housing 11, and is provided with two forwardly directed and radially-spaced concentric sleeve portions 28 and 29. Inner sleeve portion 28 receives the rear end portion of the shaft and provides a fixed connection between the parts, whereas outer sleeve portion 29 extends a substantial distance forwardly within housing 11 and, among other things, provides a mounting for impeller means.

In the particular embodiment illustrated, the impeller means comprises a two-stage turbine having first and second-stage turbine wheels 30 and 31. The first-stage turbine wheel 31 is fixed to the outer surface of the outer sleeve portions 29 at the forward end thereof and the second-stage wheel 31 is secured to the outer sleeve portion at a point spaced well behind the first-stage wheel. The first-stage turbine wheel 30 comprises an outer wall 32, an outer set of crescent-shaped turbine blades 33, a middle wall 34, and an inner set of turbine blades 35 (see FIGS. 1 and 4). The second-stage turbine wheel 31 likewise comprises an outer wall 36, an outer set of turbine blades 37, a middle wall 38 and an inner set of turbine blades 39.

A clutch ring 40 is disposed within the confines of outer sleeve 29 and is splined thereto. The splined connection of the clutch ring 40 to the outer sleeve 29 causes the clutch ring to rotate with the end cap 27 but does not impede axial movement of the clutch ring.

Formed integrally with ring 26 and extending radially outwardly thereupon, are a plurality of circumferentially spaced lever supports 41 (see FIG. 4), each lever support comprising a pair of radial arms providing a floating mounting for a lever 42. In the illustration given, a total of three levers 42 are so supported but it will be understood that a different number might be provided. Each lever 42 is axially elongated and has a fulcrum enlargement 42a which is received in the notched portion 29a of the outer sleeve 29. The levers are retained between the radial arms of the lever supports by virtue of pins 43 which extend transversely between such arms. (See FIG. 7.)

As shown in the drawings, the retaining pin and fulcrum enlargement of each lever are disposed in close proximity in a zone intermediate the length of such lever and, in combination with the notched sleeve 29 and lever supports 41, support each lever for pivotal movement in a plane extending radially and longitudinally with respect to the axis of the rotor. Furthermore, each lever is provided with an enlarged forward end portion 42b and a reduced rear end portion 42c, the forward end portion being relatively heavy and terminating a blunted forwardly-facing end surface engageable with the rear surface of clutch ring 40, and the rear end portion being relatively light and providing a flat inwardly-facing surface adapted to be engaged by counter-balancing means.

The counter-balancing means consists of a plurality of counter-balancing members 44, their number corresponding with the number of levers 42. Each member 44 has an axially-elongated spring arm portion 44a secured at its forward end to a bearing mount 45, and has an enlarged and weighted portion 44b at the free rear end thereof, the enlarged portion 44b slidably engaging the inner surface of a lever portion 42b. Each bearing mount 45 is in turn carried by an annular bushing 57 which is slidably mounted upon spacer sleeve 25 for axial movement therealong.

The stator assembly C provides radially-spaced orifices 46 and 47 which are positioned to direct drive air rearwardly towards the turbines of the rotor assembly and which communicate with the fluid inlet passages 13 and 14 respectively. The orifice 46 directs air from fluid inlet passage 13 into stator passage 46a which leads directly to the outer set of turbine blades 33 of the first-stage turbine wheel 30, and orifice 47 directs air from fluid inlet passage 14 into stator passage 47a which leads directly to the inner set of turbine blades 35 of the first-stage turbine wheel. The stator assembly also includes arcuate redirecting blades 48 for directing air passing from the first-stage turbine wheel to the second-stage turbine wheel.

The fluid flow restrictor assembly D is disposed adjacent the stator assembly C and the rotor assembly B and includes an annular body portion 49 extending circumferentially about the driveshaft 21 and freely rotatable with respect thereto by virtue of bearings 49a. The body portion 49 has outwardly extending damper plate portions 50 and 51 (see FIG. 2), movable between the stator orifices 46 and 47 and the stator passages leading to the turbine assembly for controlling the flow of air discharged from such orifices as the fluid flow restrictor is rotated. The particular embodiment shown has two laterally-spaced plate portions, but only one such portion would be necessary if the orifices were spaced apart in the transverse direction or if only one fluid inlet passage and orifice were provided. Leaf springs 52 and 53 are secured to opposite sides of the body portion 29 of the flow restricter by screws 54 which pass through one end of each spring. The other ends of the springs bear against the stator assembly and tend to maintain the flow restricter in the open position shown in FIG. 2. As illustrated most clearly in FIG. 1, the body portion is provided with a clutching surface 49b for frictional engagement with the opposing surface 40a of clutch ring 40.

The adjusting assembly E serves the function of axially adjusting the position of counter-balancing members 44. The particular adjusting assembly illustrated includes an adjusting ring 55 mounted on the housing assembly A. Threadedly engaged with the adjusting ring 55 is a control arm 56 having a downwardly-extending finger portion 56a loosely received in an annular groove 57a of bushing 57. The bushing is mounted for axial movement along the spacer sleeve 25 but may also rotate. The bearing mount 45 both supports the counter-balance 44 and allows the counter-balance to rotate independently of the bushing 57.

*Operation*

Figure 2:
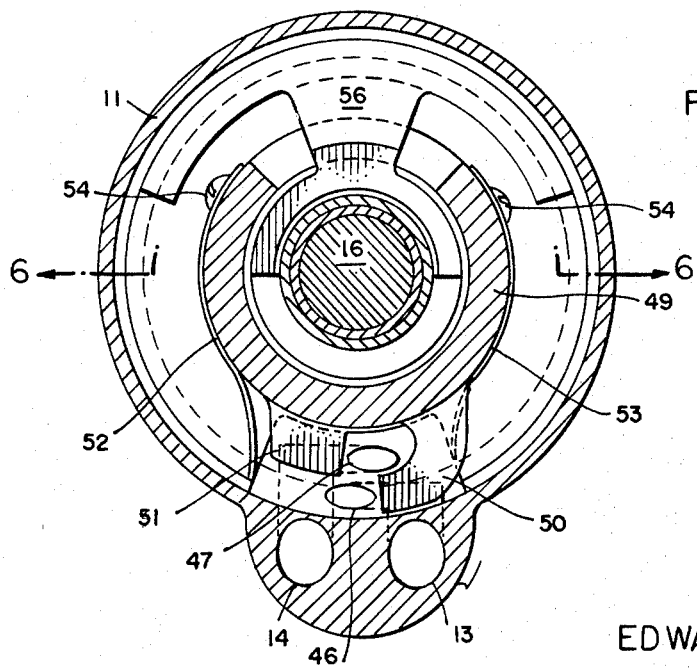
FIG. 2 is a sectional view taken along the line 2—2 of FIG. 1.
Figure 8:
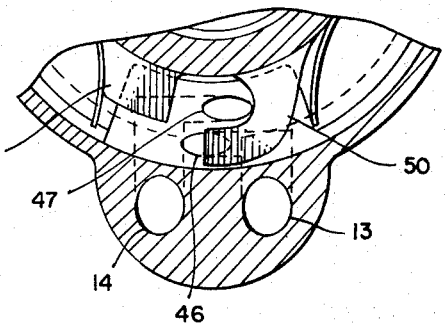
FIG. 8 is a sectional view of FIG. 2, showing the handpiece being operated at a different speed.

When the rotor assembly is stationary, the fluid flow restricter and its body portion 49 are maintained in the position shown in FIG. 2 by the springs 52 and 53. The air passes from the air inlet passage 13 through the orifice 46 unobstructed by the damper plate 50 of the body portion 49. The air is directed at an angle with the longitudinal axis of the shaft (see FIG. 8) and impinges the outer set of turbine blades 33 of the first-stage turbine wheel 30, imparting a rotational movement to the entire rotor assembly B. As the air passes from the turbine blades 33, it is directed by the stationary redirecting blades 48 to impinge the outer set of turbine blades 37 of the second-stage turbine wheel 31. If it is desired to rotate the driveshaft 16 in the opposite or reversed direction, fluid is introduced into the fluid inlet passage 14, and passes through the orifice 47 and impinges the inner set of turbine wheel blades 35 and 39 of the turbine wheels 30 and 31, respectively, imparting a rotational movement to the entire rotor assembly B. The provision of double sets of blades for each turbine wheel, and the provision of double inlet passages for drive air, results in a reversible turbine handpiece; it is to be understood that if rotation in only one direction is desired, then the second set of blades and the second inlet passage may be eliminated.

FIG. 1 shows the rotor assembly B in the position in which it would be just as the fluid starts to rotate the turbine wheels 30 and 31. As the speed of the rotor assembly B increases, the centrifugal force on the heavier end 42b of the lever 42 causes it to swing radially outwardly into contact with the clutch ring 40. The clutch ring 40 is thus urged axially forwardly as it rotates with the rotor assembly B until it contacts the body portion 49 of the fluid flow restricter. The splined connection between the clutch ring 40 and the outer sleeve 29 of the end cap 27, causes the clutch ring 40 and the lever 42 to rotate together and eliminates lateral frictional resistance between the two members. When the clutch ring 40 contacts the body portion 49, the frictional force between the rotating clutch ring 40 and the body 49 urges the fluid flow restricter into rotational movement against the biasing of the spring 53. The damper plate 50 of the fluid flow restricter is thus rotated into a position partially or fully closing the orifice 46 (see FIG. 8), and restricting or blocking the passage of drive air to the turbine wheels 30 and 31. As the flow of drive air impinging on the turbine wheels is reduced, the rotor assembly slows down and the centrifugal force exerted on the heavier end 42b of the lever 42 is decreased, with the result that the frictional force between the clutch ring 40 and the body portion 49 decreases and spring 53 tends to return the body portion 40 and the damper plate 50 into their original positions as shown in FIG. 2. However, as the damper plate 50 uncovers more of the orifice 46, the speed of the rotor assembly picks up, thus increasing the centrifugal force on the heavier end of 42b of the lever 42 and preventing further movement of the damper plate 50. Almost immediately after the fluid is first introduced, the damper plate 50 reaches a state of equilibrium in a partially covering relationship with respect to the orifice 46, the frictional force is exerted against the body portion 49 by the clutch ring 40 being equalled by the spring force exerted by the spring 53. Thus, it is seen that the minimum speed of the rotor is automatically modulated to maintain a preselected rate of rotation despite variations in the load imposed on the rotor shaft. When the dental bit first encounters rotational resistance (tooth), the load tends to cause a reduction in the speed of the rotor, and upon any such speed reduction, the pivoting of levers 42 cause a shifting of the fluid flow restricter to permit more fluid to pass to the turbine wheels, thereby restoring the rotational speed of the shaft.

If it is desired to adjust the speed of the rotor assembly, to a higher speed for example, the operator simply rotates the adjusting ring 55 (see FIG. 1) to shift the adjusting arm 56 axially rearwardly. The axial movement of the finger portion 56a of the adjusting arm 56 causes the bushing 57 to move rearwardly, which in turn shifts the counter-balance 44 relative to lever 42. As the counter-balance 44 slides rearwardly toward the lighter end 42a of the lever 42, the tendency of the heavy end 42b of the lever 42 to swing radially outwardly under the influence of centrifugal force is lessened. The arm portion 44a of the counter-balance 33 is relatively flexible, and thus the tendency of the heavy end 42b of the lever 42 to move outwardly is not completely overcome until the counter-balance 44 reaches its rearward most position.

Figure 7:
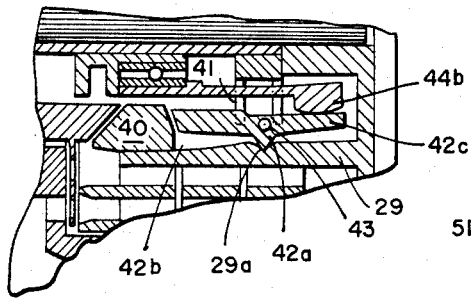
FIG. 7 is a fragmentary view of FIG. 1, showing the handpiece being operated at a different speed.

Thus, it is seen that as the movement of the adjusting ring 55 causes the counter-balance to move rearwardly, the force exerted on the clutch ring 40 by the lever 42 which urges the clutch ring 40 to move axially forwardly is decreased. As the force urging the clutch ring 40 to move axially forwardly decreases, the frictional clutching force tending to rotate the flow restricter against the bias of the spring 53 also decreases. Therefore, when the adjusting ring is manipulated to shift to the counter-balance 44 rearwardly along the lever 42, the damper plate 50 of the fluid flow restricter will tend to expose more of the orifice 46, and when the counter-balance 44 is in its rearwardmost position (as shown in FIG. 7), the orifice will be completely uncovered, (as shown in FIG. 2). In this position, the rotor assembly will rotate at its maximum speed as determined primarily by the pressure under which air is introduced and delivered by passage 13.

Additional refinements in adjustment is made possible by providing a boating mounting for the lever 42 rather than a fixed pivotal mounting. As shown most clearly in FIG. 7, the fulcrum support 42c of the lever 42 is supported by the notched portion 29a of the outer sleeve 29. The lever 42 is capable of some axial movement but the pin 43 extending transversely from the lever 42 and extending between the radial arms 41 prevents excessive axial movement of the lever. Thus, as the centrifugal force urges the heavier end 42b outwardly against the clutch ring 40, the lever is capable of some rearward axial movement. The counter-balance tends to prevent rearward axial movement of the lever 42, and the speed of the rotor is ultimately controlled by a number of co-acting elements, including the counter-balance, the lever and the clutch ring.

If it is desired to drive the driveshaft 21 in the opposite or reversed direction, fluid is instead conveyed to the driving mechanism through passage 14, and passage 13 is blocked. The fluid then passes through the stator orifice 47 and is directed against the inner sets of turbine blades 35 and 39 of the turbine wheels 30 and 31, respectively, to drive the rotor in a counter-clockwise direction, as viewed in FIG. 2. As the lever 42 urges the clutch ring 40 axially forwardly to engage the body portion 49 of the fluid flow restricter, the body portion 49 is also urged to rotate in a counter-clockwise direction against the biasing of the spring 52. Upon rotation of the body portion 40, the damper plate 51 moves into covering relation with respect to orifice 47, and the rotor assembly slows down. Thus, the same fine adjustment of the rotational speed of the rotor assembly is possible regardless of whether the rotor assembly is moving in a forward or a reverse direction.

From the foregoing, it is seen that a dental handpiece has been provided which not only may be operated any selected speed within a wide range of adjustment, but which is also self-regulating to maintain a selected speed despite load variations. Furthermore, because of the unique turbine construction disclosed, including the provision of two turbine stages, crescent-shaped blades, and the substantial distance between such blades and the rotor axis, relatively high torque is delivered even at operating speeds well below 100,000 r.p.m.

While in the foregoing specification a particular embodiment of the invention has been set forth for the purpose of illustration, it is to be understood that many of the details set forth may be varied considerably without varying the scope of the invention.

I claim:

1. A dental handpiece, comprising a housing, a turbine shaft rotatably mounted within said housing, said housing providing a turbine chamber, impeller means mounted upon said shaft within said chamber for rotating said shaft when fluid under pressure is directed thereagainst, a stator for directing fluid under pressure toward said impeller means, movable fluid flow restricter means, disposed within said housing between said stator and said impeller, said fluid flow restricter means being movable between a first position and a second position lever means pivotally mounted upon said shaft for pivotal radial movement under the influence of centrifugal force when said shaft is rotated, clutch means interposed between said lever means and said fluid flow restricter means for urging said fluid flow restricter means from said first position toward said second position when said lever means is pivoted outwardly under the influence of centrifugal force, and counter-balancing means carried by said shaft and engaging said lever means, said counter-balancing means being shiftable axially to offset the effect of centrifugal force on said lever means, and adjusting means provided by said housing for manually shifting said counter-balancing means into any of a variety of selected positions.

2. The apparatus of claim 1 in which said impeller means provides a first set of turbine blades for rotating said shaft in one direction and a second set of turbine blades for rotating said shaft in the other direction.

3. The apparatus of claim 2 in which said stator provides a first fluid passage for directing fluid toward said first set of turbine blades and a second fluid passage for directing fluid toward said second set of turbine blades.

4. The apparatus of claim 1 in which said impeller means comprises a two-stage turbine, each stage of said turbine having a first set of turbine blades adapted for rotating said shaft in one direction and a second set of turbine blades for rotating said shaft in the other direction.

5. The apparatus of claim 4 in which said stator provides a first fluid passage for directing fluid toward said first set of turbine blades and a second fluid passage for directing fluid toward said second set of turbine blades.

6. The apparatus of claim 1, said fluid flow restricter means being spring-biased to said first position.

7. A dental handpiece, comprising a housing, a turbine shaft rotatably mounted within said housing, said turbine shaft including impeller means for rotating said shaft when air under pressure is directed thereagainst in a generally axial direction, a stator within said housing for directing air in a generally axial direction towards said impeller means, damper means interposed between said stator and said impeller means and movable in a plane substantially normal to the axis of said turbine shafts for controlling the flow of air from said stator to said turbine, said damper means being movable in the direction of rotation of said turbine shaft into a first position blocking the flow of air from said stator to said turbine, and being movable in the opposite direction into a second position wherein the flow of air from said stator to said impeller is substantially unobstructed, spring means engaging said damper means and normally urging the same towards said second position, lever means pivotally mounted upon said turbine shaft for pivotal outward movement under the influence of centrifugal force when said shaft is rotated, clutch means disposed between and engageable with both said lever means and said damper means for transmitting rotational force from said lever means to said damper means and for thereby shifting said damper means towards said first position in opposition to the force exerted by said spring means, and counter-balancing means carried by said turbine shaft and engaging said lever means, said counter-balancing means being shiftable axially to offset the effect of centrifugal force on said lever means during rotation of said turbine shaft.

8. The structure of claim 7 in which adjusting means is provided by said handpiece housing for manually shifting said counter-balancing means into any of a variety of selective positions.

9. The structure of claim 7 in which said lever means includes a plurality of elongated levers disposed in a uniformly-spaced circumferential series about said turbine shaft and extending in generally axial directions with respect to said shaft, each of said levers being pivotally connected at an intermediate point thereof to said shaft for pivotal movement of each lever in a generally radial plane, each lever having a relatively heavy end portion frictionally engageable with said clutch means and a relatively light opposite end portion, the relatively light end portion of each lever being engaged by said counter-balancing means.

10. The structure of claim 9 in which said counter-balancing means includes a plurality of axially-extending spring arms mounted upon said rotor shaft for rotation therewith, said spring arms having weighted free-end portions engaging the inner surfaces of the relatively light end portions of said levers.

References Cited
UNITED STATES PATENTS
2,768,546 10/1956 Amtsberg _____ 253—3 X
2,974,553 3/1961 Donowick _____ 253—2 X EVERETTE A. POWELL, JR., *Primary Examiner.*